INVENTOR
James J. Hill

BY Spencer & Kaye
ATTORNEYS

AUTOMATIC TELEPHONE ANSWERING DEVICE HAVING REMOTE CONTROL AND CONFERENCE CALL CAPABILITY
Filed Nov. 10, 1964

INVENTOR
James J. Hill
BY Spencer & Kaye
ATTORNEYS

Aug. 18, 1970 J. J. HILL 3,524,936

AUTOMATIC TELEPHONE ANSWERING DEVICE HAVING REMOTE CONTROL AND CONFERENCE CALL CAPABILITY

Filed Nov. 10, 1964 8 Sheets-Sheet 3

INVENTOR
James J. Hill

BY Spencer & Kaye
ATTORNEYS

INVENTOR
James J. Hill
BY Spencer & Kaye
ATTORNEYS

INVENTOR
James J. Hill
BY Spencer & Kaye
ATTORNEYS

INVENTOR
James J. Hill

BY Spencer & Kaye
ATTORNEYS

INVENTOR
James J. Hill
BY Spencer & Kaye
ATTORNEYS

INVENTOR
James J. Hill
BY Spencer & Kaye
ATTORNEY.

3,524,936

AUTOMATIC TELEPHONE ANSWERING DEVICE HAVING REMOTE CONTROL AND CONFERENCE CALL CAPABILITY

James J. Hill, Miami, Fla., assignor, by mesne assignments, to World-Wide Electronics, Inc., Miami, Fla., a corporation of Florida Filed Nov. 10, 1964, Ser. No. 410,112
Int. Cl. H04m *1/00, 1/20, 1/64*
U.S. Cl. 179—6 16 Claims

ABSTRACT OF THE DISCLOSURE

A telephone answering and automatic callback system arranged to be associated with a telephone and to be inductively coupled with the telephone receiver and transmitter, the system being constructed to transmit a prerecorded message to callers and to record messages left by the callers, and being further constructed to automatically play back the recorded received messages to a caller at a distant telephone upon receipt of a call back code message from that distant telephone and to automatically terminate play back of the recorded messages when all of the messages thus far recorded have been played.

The present invention relates generally to an automatic telephone answering device, and, more particularly, to such a device for automatically responding to incoming telephone calls at an unattended telephone and for playing them back when desired over the telephone, the latter being referred to as "callback."

Automatic telephone answering devices are not in themselves new. Such devices are known and automatically answer the telephone, relay a message to the caller, and allow the caller a predetermined period of time within which to record a message of his own. The recorded sequence of messages which various callers have left may then be played back at the convenience of the owner of the device. However, various deficiencies in prior art devices have demonstrated that there is a substantial need for a reliable and low-priced automatic answering device.

More particularly, many of the prior art devices used equipment such as stepping switches, time delay relays, transistorized switching circuits and other expensive, complicated, and oft times undependable elements for controlling and regulating the basic timing cycle of the device. Many of these were expensive to manufacture, difficult to service and unreliable.

A further deficiency of certain prior art devices was that they had to be conductively (rather than, e.g. inductively) connected with a telephone. Such a connection is ordinarily not allowed by the telephone company, so that the use of such devices is limited. Other answering systems, in an effort to surmount this problem, used inductive loops to couple the device to the telephone, and solenoid-operated levers to lift the receiver when the phone rang. This solution was not completely satisfactory, however, for the sudden lifting of the telephone receiver created a noise disturbing to the caller and sometimes jarred the receiver off the lifting member.

Certain proposed devices allowed a caller from a telephone remote from the one connected in the answering system, by means of a special signal, to initiate a read-out of messages recorded in the system. The length of the time during which messages were read out, however, bore no relationship to the total length of messages recorded on the tape. Moreover, those messages which were not read back to the caller were often erased, so that they were never actually received. This happened whenever the preset read-out time was less than the total time of recorded messages.

With these defects of the prior art in mind, it is a main object of the present invention to provide an automatic telephone answering device including a central timing unit which is simply constructed and highly reliable.

It is another object of the present invention to provide an automatic telephone answering device, which, upon interrogation by a distant caller, will read out all the messages previously stored in the answering device with no loss of information, and then reset itself to receive further messages.

It is a further object of the present invention to provide an automatic telephone answering device in which the timing cycle is controlled by a series of individually adjustable cams on a motor driven shaft.

A still further object of the present invention is to provide an automatic telephone answering device which requires no direct electrical connection with the telephone to be answered, and which picks up the telephone receiver smoothly.

Still another object of the present invention is to provide a method for initiating read-out of all the messages stored in a remote telephone answering device by sending a signal of predetermined frequency to the device and which is recorded on the message tape after the last previous message and which also actuates a read-out cycle, and causing the device to respond to the signal so recorded when it is played back at the end of the sequence of messages read out, so that the read-out cycle will immediately be completed, resetting the device to receive further messages.

It is a still further object of the instant invention to provide an apparatus usable in carrying out the above-mentioned method.

Yet another object of the present invention is to provide an automatic telephone answering device which is versatile and may be operated in various modes including a manually operated tape recorder.

Another object of the present invention is to provide an automatic telephone answering system which may be used to carry on a conference call, by providing a high sensitivity, high audio output conference microphone which may be used in place of the telephone handset.

SUMMARY OF THE INVENTION

These objects and others ancillary thereto are accomplished according to preferred embodiments of the invention wherein a system is provided including two tape decks, an OUT tape deck on which an outgoing message may be recorded and then played back in response to incoming calls, and an IN tape deck, upon which incoming messages from callers are recorded. When in operation as an answering system, the device, upon actuation by an incoming phone call, first picks up the telephone receiver, then causes the OUT tape deck to play its recorded message over the telephone to the caller, and finally allows the caller to record a message on the IN tape deck. After this, the receiver is placed back onto its cradle, and the device is ready for the next call.

For lifting the receiver from its cradle, the device utilizes a cam-actuated lever. The lever actuating cam is mounted on a central cam shaft along with other cams for opening and closing various switches during the cycle to control operation of the system. The cam shaft is driven by an electric motor which is started by an incoming call and which stops automatically at the end of a predetermined period of time. The cycle length is a constant, but it may be varied. A one minute cycle may conveniently be used.

The automatic callback feature of the device allows the owner, if he has the proper transmitter, to transmit by telephone a special code signal instead of leaving a message; that is, after the OUT tape message is through and during the IN tape record portion of the cycle. At the end of the OUT tape message, a tone is heard, signifying that the caller may either record a message or transmit the code signal. The signal is transmitted for two or three seconds, and during that time is recorded on the IN tape deck in place of a message. The code signal also triggers a decoder, the output of which, as soon as the signal ceases, initiates the read-out cycle. This includes rewinding the message tape on the IN tape deck to its beginning, and then playing back the messages which have been left, sequentially, to the caller. This continues up until the time when the playback head on the tape recorder senses the transmitter code signal which was recorded immediately before beginning the read-out cycle. This signal again triggers the decoder circuit, which, immediately after the signal ceases, causes the tape to rewind far enough so that subsequent recording will erase the transmitter code signal. By this means, that particular code signal is prevented from actuating the decoder during future playback operations. After this short rewind, the read-out cycle is ended and the receiver is hung up, thus placing the unit in condition to receive further messages.

BRIEF DESCRIPTION OF THE DRAWINGS

Additional objects and advantages of the present invention will become apparent upon consideration of the following description when taken in conjunction with the accompanying drawings in which.

DETAILED EXPLANATION OF SYSTEM COMPONENTS

Figure 4:
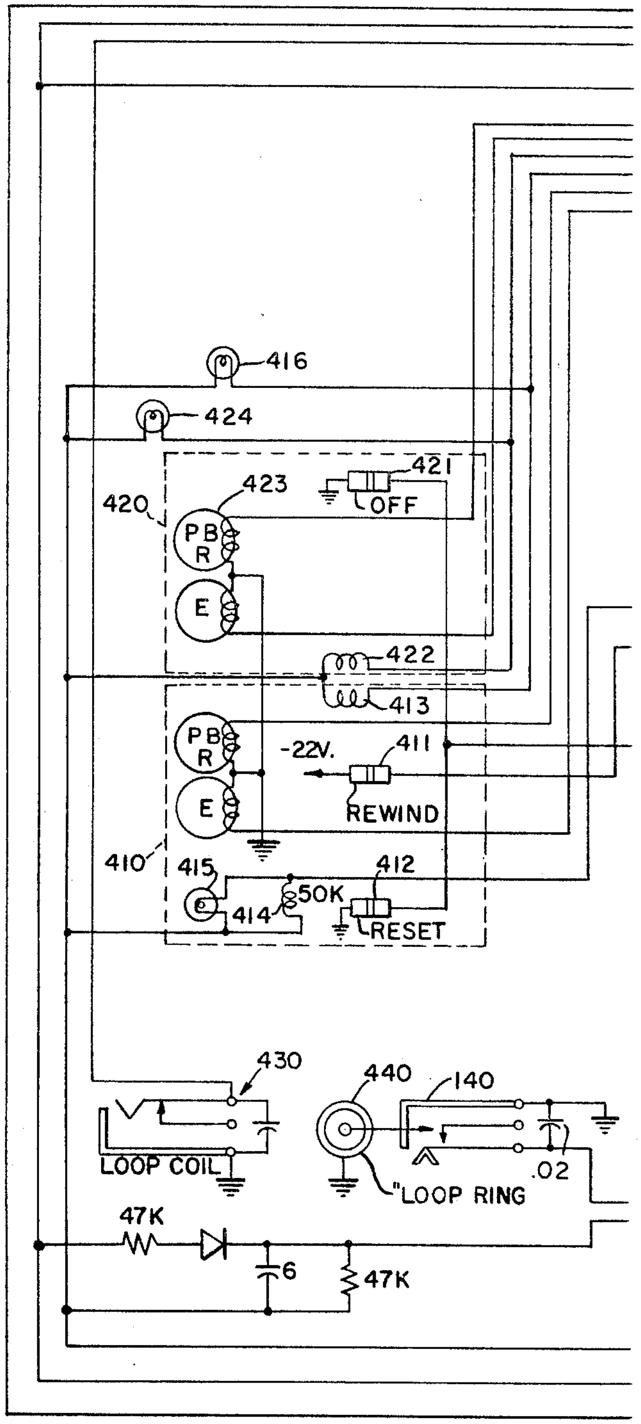
Figures 5, 8, 9:
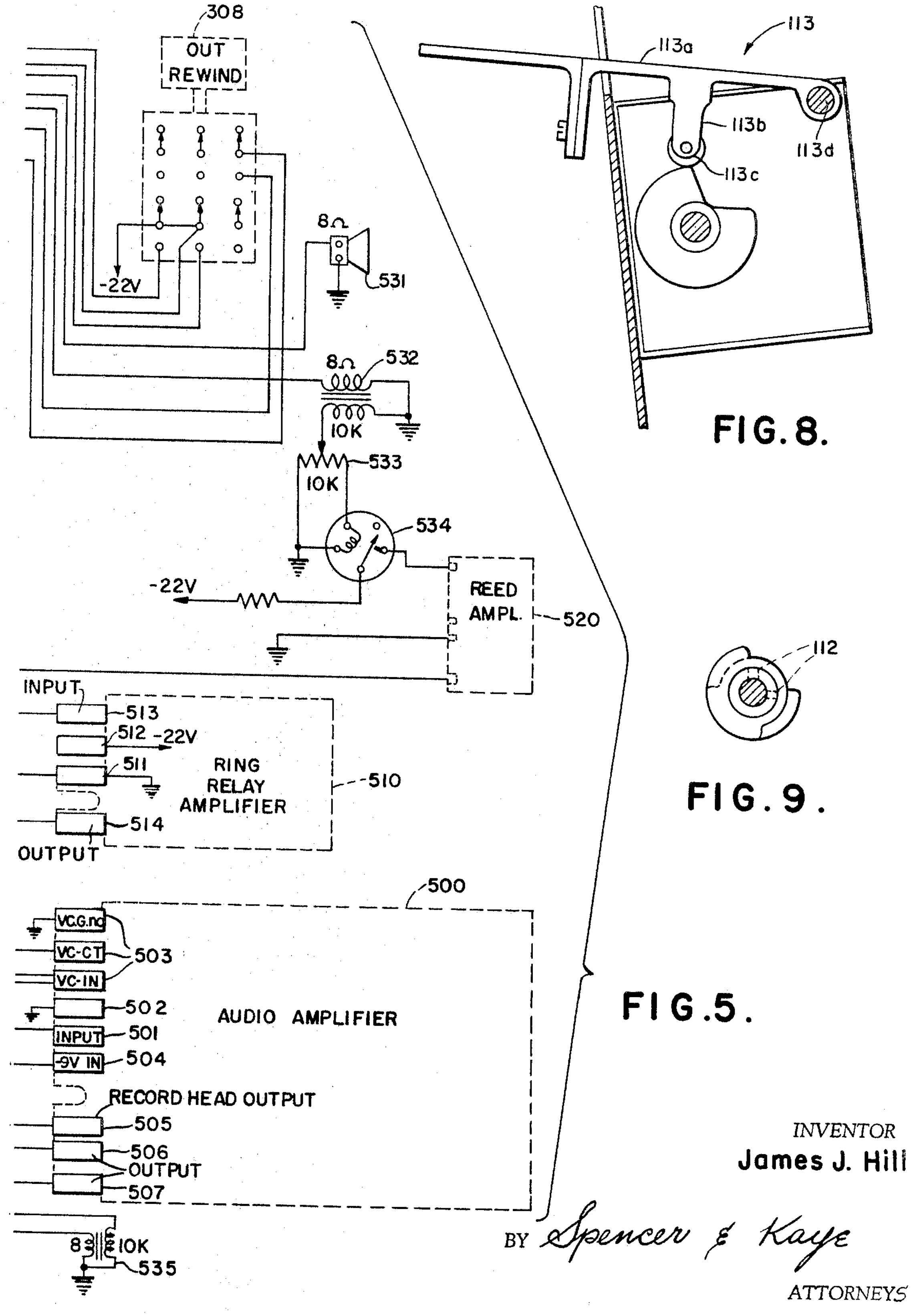
FIG. 8 is a sectional view of the timer taken substantially along the plane defined by reference line 8—8 of FIG. 7.
FIG. 9 is a sectional view of the timer taken substantially along the plane defined by reference line 9—9 of FIG. 7, certain elements being omitted for clarity.
Figure 10:
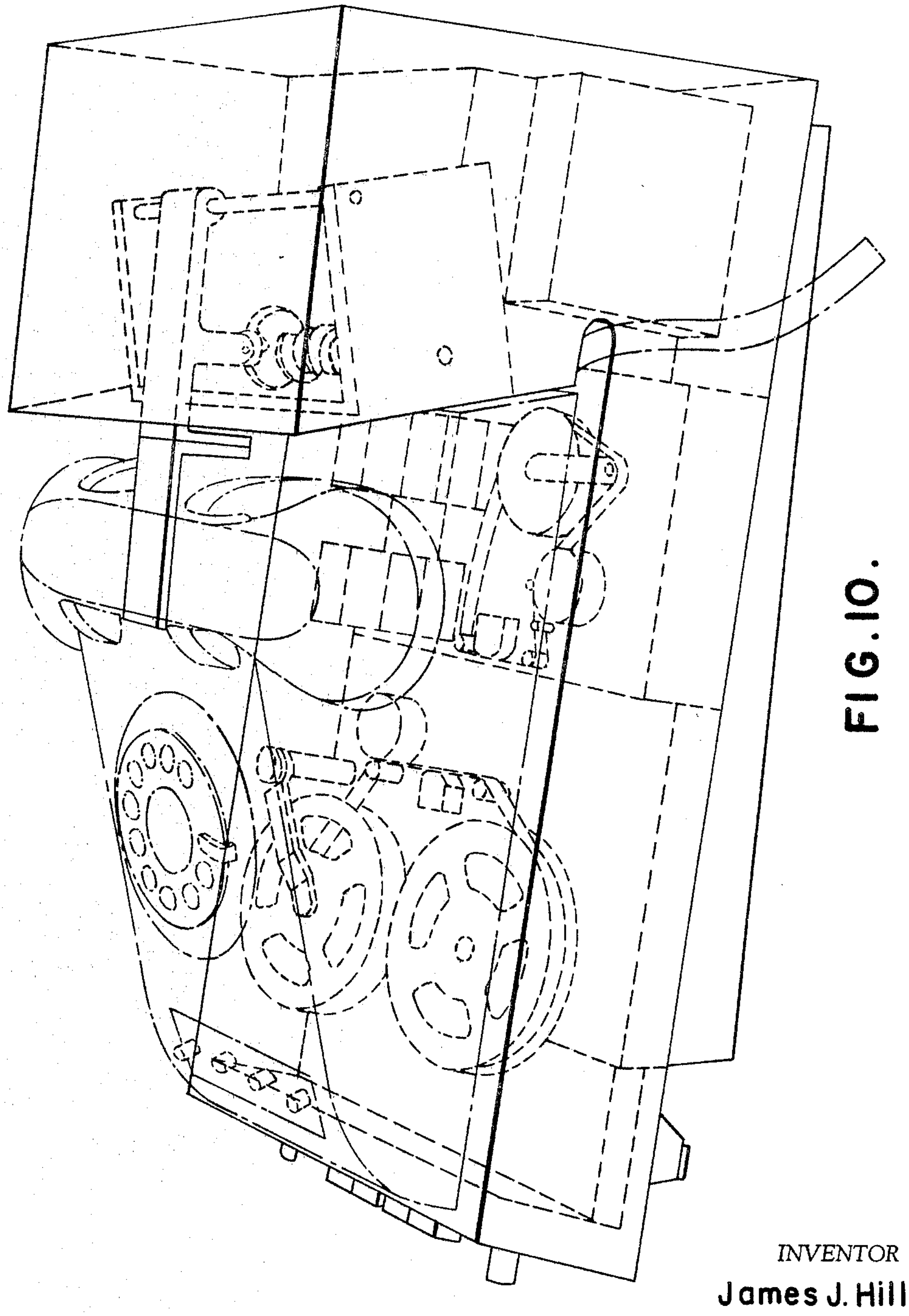
FIG. 10 is a schematic perspective view of the layout of the various units in a system designed according to the invention; a telephone is shown mounted thereon.

The system may be divided into five major component blocks; a timer (FIG. 1), a relay block (FIG. 2), a control panel (FIGS. 3 and 5), a tape recorder section (FIG. 4), and an amplifier section (FIG. 5).

Timer

The timer unit 100 shown in FIGS. 1 and 7 to 9, controls the timing cycle of the device during automatic operation. It includes a timer motor 101 which is preferably a synchronous motor, driving a cam shaft 102 through a gear train **102*a*. Nine cam elements 103–111 are mounted on cam shaft 102. Eight of the cams, 103–110, actuate electric switches, while the ninth, 111, actuates a mechanical follower 113 for lifting the telephone receiver at the beginning of a call cycle and replacing it at the end of the cycle. Follower 113 includes a lever 113*a* which is generally horizontally disposed and which has a downwardly projecting follower arm 113*b* supporting a follower roller 113*c* which engages the central surface of cam 111. The follower 113 is pivotally mounted on rod 113*d***. The use of a cam-actuated arm for lifting the receiver, rather than a solenoid or some other means, allows the receiver to be lifted from its cradle in a smooth and continuous lifting motion, precluding the possibility of the receiver being jarred off the apparatus, avoiding transmission of any unpleasant noise to the caller.

Figure 7:
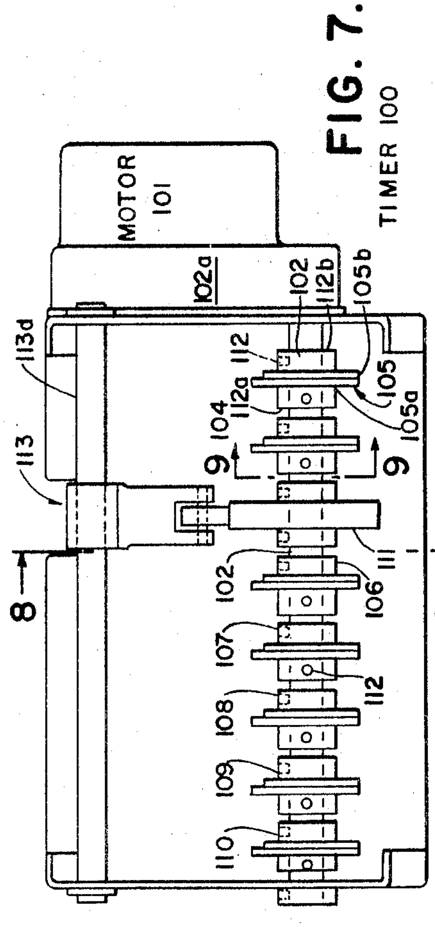
FIG. 7 is an elevational view of a cam-actuated timer.

The electric switches actuated by cams 103–110 act in a predetermined sequence to operate various components of the system at given times. The sequential operation will be explained in greater detail later. As shown in FIG. 7, the cam elements may be fastened to the shaft 102 by means of set screws 112, so that they may be independently adjusted angularly on the shaft. The total call cycle is normally of a fixed length, so that variation of the individual cam settings will vary the time within the cycle at which various operations take place.

In addition to the cams being angularly adjustable on cam shaft 102, each of these switch cams includes two segments, e.g. **105*a* and 105*b*, which constitute separate axial halves of a cam as shown for example in FIGS. 7 and 9. Cam segments 105*a* and 105*b* include sleeves 112*a* and 112*b* projecting therefrom, and set screws 112** pass through these sleeves to engage and lock the cam segments to the cam shaft. As can be seen from FIG. 8, the cam segments are provided with identical cam surfaces. When these surfaces are in angular alignment the effective cam surface of the cam is a minimum and when they are angularly offset the effective cam surface is a maximum. These two cam segments can be angularly adjusted with respect to each other to either of the above positions or to any position between the two. In this fashion the length of the time period of actuation of the various switches can be adjusted. The relative timing of the actuation of the switches is adjusted by changing the relative angular positions of the cams with respect to one another.

Figure 1:
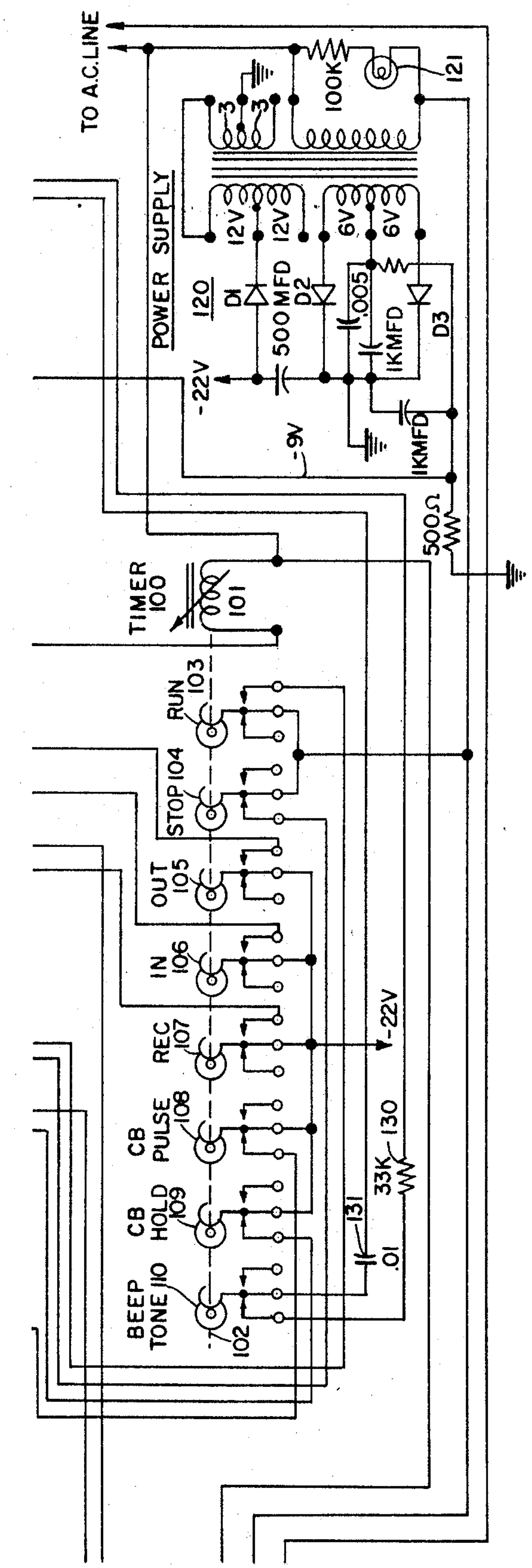
FIGS. 1 through 5 together constitute a schematic diagram of an automatic callback system exemplary of the invention.

Referring to FIG. 1, the cams include RUN cam 103; STOP cam 104; OUT cam 105; IN cam 106; RECORD cam 107; CALLBACK PULSE cam 108; CALLBACK HOLD cam 109; and BEEP TONE cam 110. One revolution of the cam shaft 102 is equivalent to one cycle of operation.

Power supply

Power supply 120, shown in FIG. 1, includes outputs of —9 volts, —22 volts, and 117 volts A.C. These voltages are compatible with the particular components used in the embodiment shown; any power supply producing any desired voltages, compatible with equivalent components, may be used.

Relay block

Figure 2:
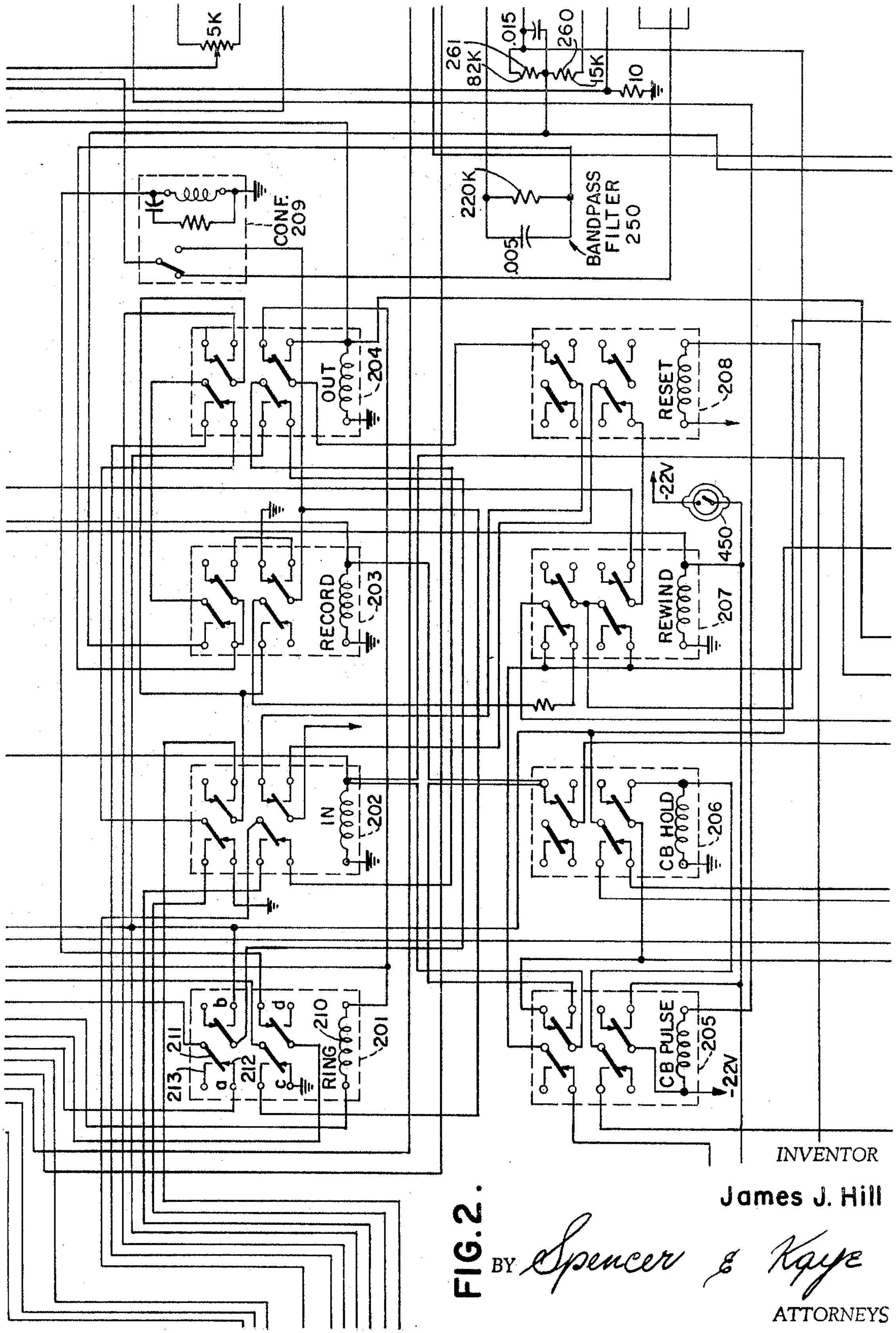

FIG. 2 shows a block of relays. These are the RING relay 201, IN relay 202, RECORD relay 203, OUT relay 204, CALLBACK PULSE relay 205, CALLBACK HOLD relay 206, REWIND relay 207, and RESET relay 208. A conference relay 209 is also shown, which for normal operation works in conjunction with RECORD relay 203. As illustrated by RING relay 201, each relay except the conference relay has an energizing coil 210, and four sets of contacts *a, b, c* and *d*. An arrow 212 designates the contact which is connected to each armature 211 when the relay is not actuated and the other contact 213 of the contact set is connected to armature 211 in the actuated position. The system operation of these relays will become clear at a later point. FIG. 2 also shows a foot switch 450 for manually rewinding the tape recorder.

Control panel

Figure 3:
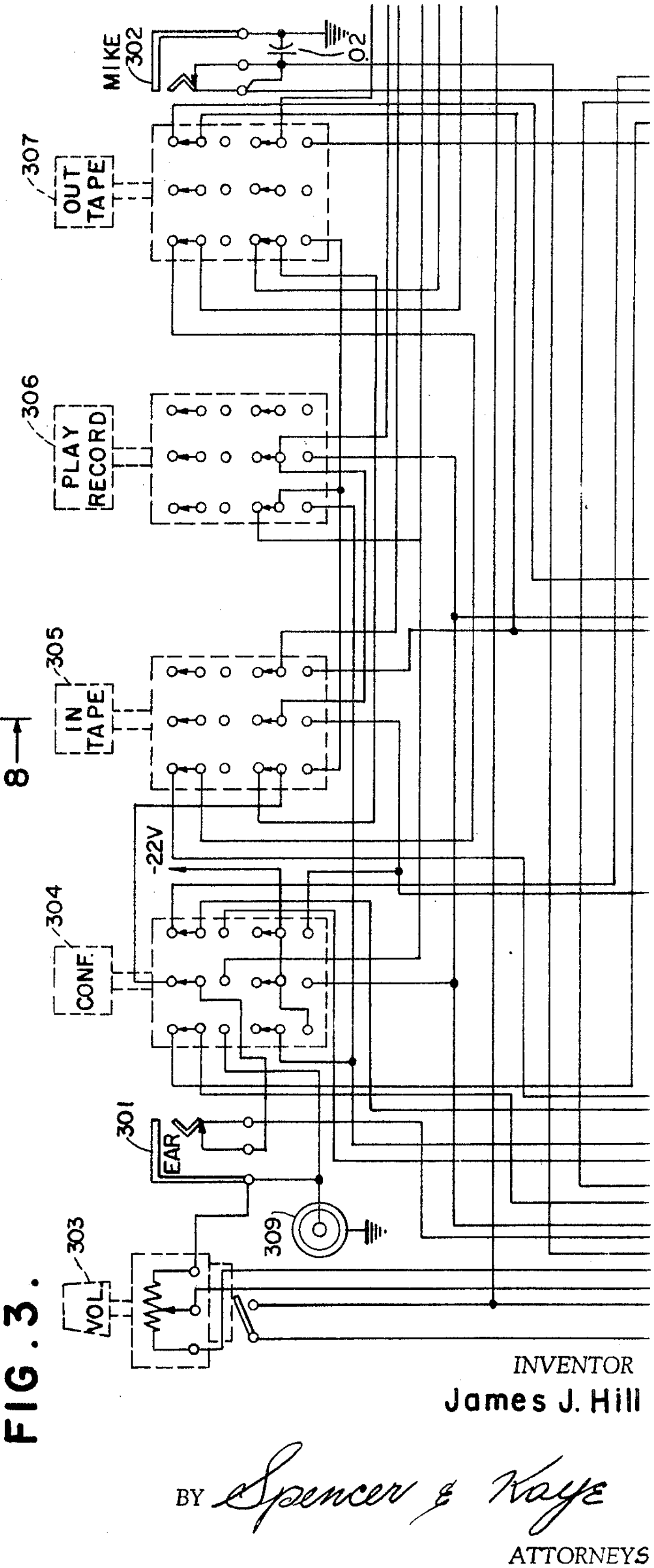

FIG. 3 shows a group of push buttons, which may be mounted on a control panel, for manual operation of the system. The control panel may include a jack 301 for earphones, a jack 302 for a microphone, a jack 309 for a remote control conference switch, a combination volume control and off-on switch 303, a Conference switch 304, an IN tape switch 305, a PLAY-RECORD switch 306, an OUT tape switch 307, and an OUT-REWIND switch 308. OUR-REWIND switch 308 is shown in FIG.

Figure 6:
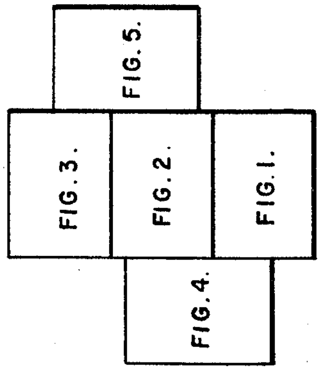
FIG. 6 is a schematic view showing how FIGS. 1 through 5 fit together.

5 which is connected in the circuit as indicated by FIG. 6.

Each of the push button switches 304–308 (FIGS. 3 and 5) is shown as a two-position switch, which is in effect six single-pole, double throw switches. The arrows indicate connections when the push button is not depressed. As seen in FIGS. 1 and 4, the control panel may also carry indicator light 415, connected in parallel with the rewind solenoid 414 of the IN tape deck, an indicator light 121 to indicate when the power is on, and indicator lights 416 and 424, connected in parallel with IN tape and OUT tape drive motors 413 and 422, respectively.

Tape recorders

FIG. 4 shows the IN tape recorder 410 and the OUT tape recorder 420, the audio loop coil jack 430, and the "ring" pick-up loop 440. The "ring" loop 440 is shown plugged into jack 140.

The IN (incoming message) tape recorder may be any standard tape recorder. It should be of small size, capable of fast and automatic rewind, and afford constant tape speed. The exact limitations upon allowable variation of tape speed will become clear later (see General Considerations; Miscellaneous).

The OUT tape recorder may also be any one of a number of standard units. It should be highly compact but need not meet the stringent criteria on constancy of tape speed which the incoming message tape recorder must meet. The OUT tape recorder may be of the continuous tape loop type, in which a single tape loop, for instance wound as a Möbius strip, is used. If this is the case, then no rewind is necessary. As the end of the tape loop is reached, the drive motor is stopped; restarting it will play the recorded message over again. It should be capable of recording on the tape and playing back from it. The length of the tape loop is determined by tape speed and the desired length of the outgoing message. At some point in the tape loop, at the end of the outgoing message cycle, a metallic insert should be provided, or the tape should be coated with a metallic film. The OUT tape recorder should be provided with a split contact 421 in the path of the tape, so that when the metallic segment of tape passes the contact it will short the two contact halves together, thus completing a circuit. The IN tape recorder 410 is provided with two similar split contacts 411 and 412, the purpose of which will become clear later. The IN and OUT tape recorders are driven by means of motors 413 and 422, respectively. Both recorders shown herein use D.C. recording and erase bias.

Audio loop coil jack 430 (as well as the other jacks) may be a standard plug-type jack, to which an audio loop pick- up coil (not shown) is to be connected. This coil is placed on the earpiece of the telephone handset, and serves both to pick up messages from the telephone and to transmit messages from the device to the telephone. Such coils are well known.

Amplifiers

FIG. 5 shows the amplifier section of the system. It contains audio amplifier 500, ring relay amplifier 510, and reed amplifier 520.

The audio amplifier 500 may be any audio amplifier, preferably a transistor amplifier to minimize the space required. In the embodiment shown, the amplifier 500 includes an audio input 501, a ground connection 502, and three volume control terminals 503. Volume control potentiometer 303 (FIG. 3) is connected between two of the terminals 503; VC-input and VC-ground. The center tap of potentiometer 303 is connected to the third terminal 503, designated VC-center tap. The amplifier also has an input 504 to which a −9 volt source is connected for providing recording bias to the tape recorder heads, a record head output terminal 505, and output terminals 506 and 507.

Audio amplifier 500 may be switched by means of relays 201–208 to amplify any one of the various audio inputs and to drive any one of the audio outputs. It is preceded by a band-pass filter 250, shown in FIG. 2, to filter out any extraneous noise, which would otherwise appear at the amplifier output.

Ring relay amplifier 510 includes a −22 volt terminal 512 for supplying bias current to its transistors, an input 513, an output terminal 514, and a ground terminal 511 connected as shown. The input 513 of relay amplifier 510 is connected to "ring" loop 440, shown in FIG. 4, via the Conference switch and jack 140. Its output 514 is connected to the actuating coil of RING relay 201, shown in FIG. 2.

These amplifiers may conveniently be of the plug-in type, so that they may easily be removed or replaced. This also contributes to the small size of the complete system.

Reed amplifier 520 may be any standard amplifier. Its function is to amplify the signals from the resonant reed 534, and its output is connected to actuate the CALL-BACK PULSE relay 205 (FIG. 2).

The resonant reed 534 is fed via a potentiometer 533 from a transformer 532. It is actuated by a signal from the output 506 of audio amplifier 500, which is connected in series with earphone jack 301, IN take push button 305, OUT tape push button 307, and the primary transformer 532. The reed is used to detent a code signal of a predetermined frequency and to initiate automatic callback operation, which will be explained later.

SYSTEM OPERATION

Timing

Figure 11:
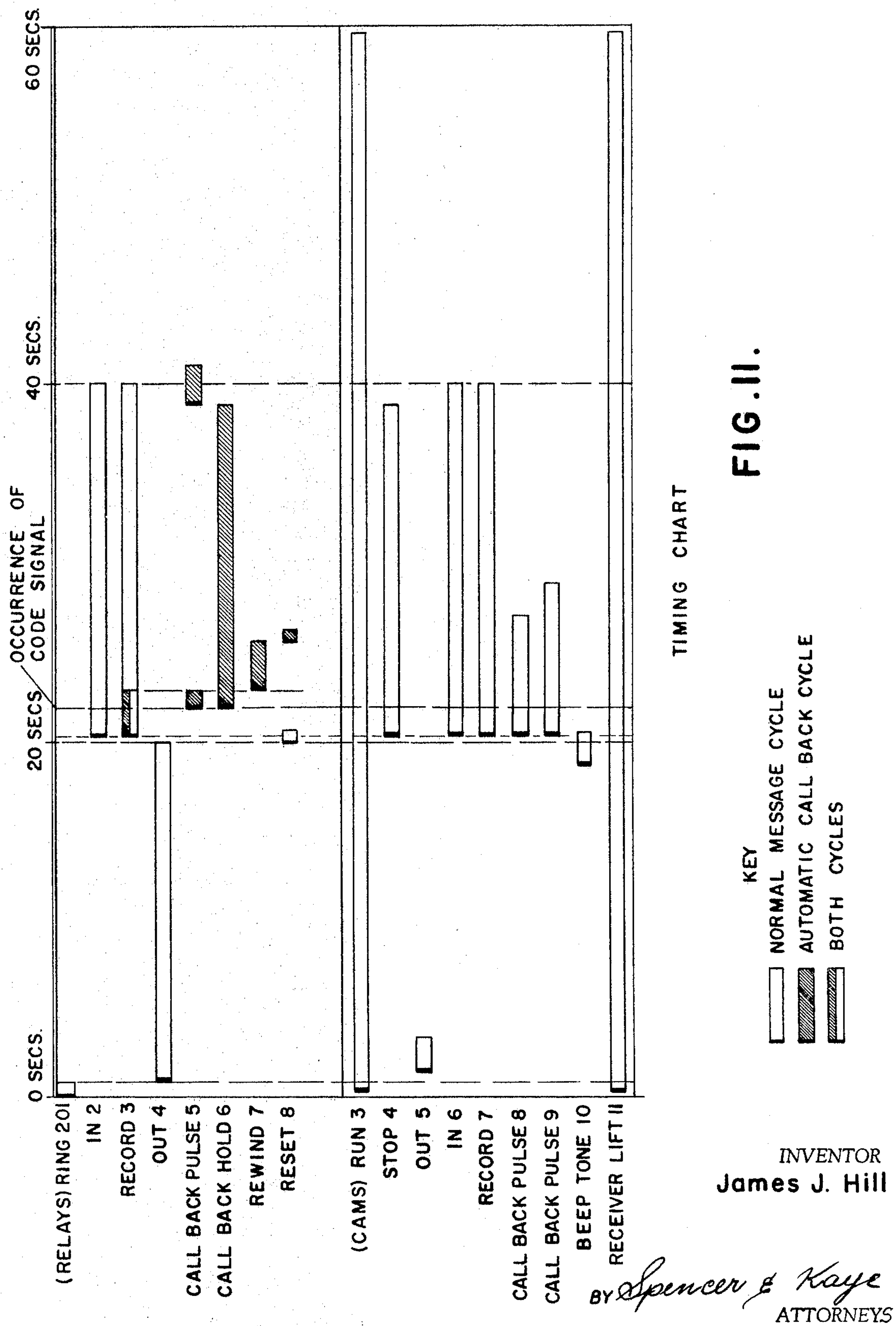
FIG. 11 is a timing diagram, illustrating the time and duration of operation of the various relays and cam-actuated swtiches.

In order to facilitate understanding of the sequence of the operations taking place during the different cycles of operation, a timing chart is shown in FIG. 11. The horizontal direction represents time, and in the example given, the cycle length is 60 seconds. The chart is not drawn to scale; moreover, it will be obvious that many variations in timing are possible by varying the setting of the cams in the timer unit.

The open bars in FIG. 11 represent occurrences during the normal message cycle; the filled-in bars represent operations which occur during the automatic callback cycle. The graph is not drawn to scale for the automatic callback cycle, since the timing mechanism stops during a portion of it.

Automatic answering mode

To prepare for operation in the automatic answering mode, a message is first recorded on the OUT tape deck, and the device is connected to the telephone. The latter connection may be achieved by merely placing the telephone properly on the unit, slipping the audio loop over the telephone earpiece, placing the "ring" loop 440 adjacent the ring transformer in the telephone (e.g., by means of a suction cup), and turning the unit on. Further operation of the device is now automatic.

OUT tape subcycle

When the telephone rings, the ringing current is picked up by "ring" induction loop 440, which actuates ring relay 201 via relay amplifier 510. The amplifier 510 output circuit includes, in series, RING relay 201, (connection of a relay will always mean connection of its actuating coil unless otherwise specified) OUT relay contact set *d*, RESET relay contact set *b*, and IN relay contact set *d*. Thus, if any of the IN, OUT, and RESET relays is actuated, ringing of the telephone will not actuate the RING relay.

One terminal of the timer motor 101 is connected directly to the A.C. line. The other terminal of the timer motor is connected to the other side of the A.C. line through contact set *b* of RING relay 201, contact set *c* of the OUT relay and contact set *c* of the IN relay. Thus, when the RING relay is actuated, RING relay contact set *b* closes, starting the timer motor. This causes cam 111 to actuate lever 113, lifting the telephone receiver from its cradle.

Almost immediately, the OUT cam 105 on the shaft 102 of the timer motor 101 closes its associated contacts, actuating the OUT relay 204, by connecting it to a source of —22 volts. This causes two things to happen: first, since the energizing circuit of RING relay 201 is connected through normally closed contacts *d* of the OUT relay, any spurious signals will be ineffective to actuate the RING relay. Secondly, OUT relay contact set *c* connects the OUT tape deck motor 422 across the A.C. line, via contacts *c* of the IN relay. This starts the outgoing message, which has been prerecorded on the tape in the OUT tape deck.

The OUT cam oniy momentarily actuated the OUT relay coil, applying —22 volts to it. This actuation, however, caused OUT relay contacts *d* to switch, forming a *holding circuit* by connecting the OUT relay coil through contacts *b* of the RESET realy 208 and contacts *d* of IN relay 202 for a source of —22 volts; thus the OUT relay 204 remains actuated.

OUT relay contact set *a* serves to connect the playback head 423 of the OUT tape recorder 420 to input 501 of audio amplifier 500. Output 507 of audio amplifier 500 is connected via transformer 535, through the Conference relay 209 and microphone jack 302 to the audio loop coil (not shown) via jack 430. The audio loop coil thus acts as a transmitter.

For all except conference operation, Conference relay 209 acts in conjunction with record relay 203, since the actuating coil of the Conference relay is connected via contacts *d* of the ring relay (which will normally be closed) to the actuating coil of the record relay.

It will be recalled that one terminal of the timer motor 101 was connected to the A.C. line via RING relay contacts *b*. These contacts were opened as soon as the RING relay coil circuit was opened, upon actuation of the OUT relay. However, just before operation of the OUT cam contacts, RUN cam 103 actuated its associated contacts, connecting timer motor 101 to the A.C. line via contacts *c* of the CALLBACK HOLD relay 206. In the normal cycle of operation RUN cam 103 and STOP cam 104 (the operation of which is not relevant to the automatic answering cycle, but will be explained later) will maintain the timer motor 101 on until the completion of the cycle.

At the end of the recorded message on the OUT tape deck, but before the OUT tape deck subcycle is completed, a metallic strip in the output tape shorts together and two halves of split contact 421, acuating the RESET relay 208 for a short period. It will be recalled that the OUT relay holding circuit, defined above, included contacts *b* of the RESET relay; thus when these contacts are opened by actuation of the RESET relay, the OUT relay is deactuated, turning off the OUT tape deck motor 422.

At this point, BEEP TONE cam 110 closes its associated contact (which is normally open) for about one second. This connects the recording head output 505 to VC-input 503 of audio amplifier 500 in a feedback circuit. This circuit includes resistors 260 and 130, and capacitor 131, and is designed to provide positive feedback around the amplifier 500, causing it to oscillate. These oscillations are heard by the caller as a "beep" signifying that the system is prepared to record any message he wishes to leave.

IN tape subcycle

As the "beep" signal ends, the RECORD and IN cams actuate their associated contacts, setting up IN tape deck 410 to receive the incoming message.

Actuation of the RECORD cam contact actuates RECORD relay 203 (and thus also the Conference relay 209), while the IN relay contact causes the IN relay to be actuated. IN relay contacts *d* now maintain the RING relay circuit open, so that any oscillations picked up by "ring" loop 440 can not operate the RING relay. IN relay contacts *c*, energize the IN tape drive motor 413 by connecting it across the A.C. line.

The audio loop coil on the telephone headset is connected via jack 430, short-circuited microphone jack 302, Conference relay 209 and RECORD relay contacts *d* and *b*, to the input 501 of audio amplifier 500. The recording head output 505 of audio amplifier 500 is connected via RECORD relay contacts *a*, OUT relay contacts *a*, and IN relay contacts *a* to the record head of IN tape deck 410. Thus, the audio loop coil picks up the message to be recorded, transmitting it to the IN tape recording head.

At the end of the time allocated for the incoming message, which may conveniently be about 20 to 30 seconds, the RECORD and IN cams open their associated contacts causing the IN tape recorder 410 to stop and the RECORD relay to be deactuated. At the end of the cycle, the telephone receiver is lowered by the receiver lift lever 113, driven by cam 111, back onto its cradle, at which point the RUN cam 103 opens its associated contact, causing the timer motor to stop. At this point, the unit is ready for a new incoming message.

End-of-tape automatic rewind

Messages will be stored sequentially on the tape until it has run almost its full length, at which time a metallic segment of tape short circuits together the two segments of split contact 411, provided in the path of the tape along with a second split contact 412.

These split contacts may be the same as split contact 421, previously described with reference to OUT tape deck 420.

Split contact 411 acts as a rewind trigger, and must be placed ahead of split contact 412 in the tape path; that is, with the tape running in the recording direction, any point on it must pass contact 411 before it passes contact 412. The reason for this is that contact 412 is a reset trigger, causing the rewind operation to cease when a second metallic segment, near the *beginning* of the IN tape shorts its two halves together. Since the tape is travelling backwards when this occurs, the reset trigger 412 is contacted first by the latter metallic segment, causing the tape to stop before the same segment touches rewind trigger 411.

When trigger 411 is contacted, it causes actuation of REWIND relay 207. Since the triggerpulse is of necessity a short one, holding circuit is immediately set up to latch the REWIND relay in its actuated position. The holding circuit includes REWIND relay contacts *d*, RESET relay contacts *c*, and IN relay contacts *d*; this connects —22 volts across the coil of REWIND relay 207.

When the tape is nearly rewound, the second metallic insert will contact the reset trigger 412, momentarily actuating RESET relay 208. This opens RESET relay contacts *c*, breaking the REWIND relay holding circuit and ending the rewind operation. The device will now record further messages, erasing those already on the tape, starting with the oldest one.

During the period when the REWIND relay is actuated, its contact set *c* opens the —9 volt source which energizes the erase head on the IN tape deck, so that if, for instance, the manual record button 306 is depressed during this time, the erase head can not be actuated during rewind. This assures that no messages are erased from the tape unless necessary to make room for new ones. In addition, REWIND relay contacts *c* disconnect the D.C. bias current source from the playback head, to mute the audio during rewind.

In the tape deck 410 used in the embodiment shown in single drive motor is used; rewind is accomplished by changing the tape drive wheels. This may be done by a solenoid-operated mechanism, such as is well known in the art. Solenoid 414 performs this function, and is actuated via CALLBACK PULSE relay contacts *a* in series with REWIND relay contacts *a*.

Automatic callback mode—Operational sequence

The automatic callback feature of the system of the invention allows anyone with the proper transmitter to call in from any telephone to the telephone connected with the device and to transmit a code signal to it, at which point the device will play back to the caller, over the telephone, all the messages which have been recorded in its IN tape deck. When one calls in from outside to interrogate the tape deck, he must wait until the outgoing message has been played and the beep tone has occurred, signalling that he may record his message in the device. Thus, up to this point, the cycle of operation in automatic callback is identical with that of the normal message cycle. However, instead of leaving a message after the beep tone, the caller must use his transmitter to transmit an interrogation code signal over the telephone line. This signal should be maintained for two or three seconds.

Just prior to the code signal, the system was set so that the audio pick-up loop, on the telephone headset, was connected to the input 501 of audio amplifier 500, as described above. The system was set to record any incoming message on the IN tape deck 410. The signal from the transmitter may be a sine wave of a predetermined frequency, such as will operate the resonant reed 534. The output 506 of audio amplifier 500 is connected via transformer 532 to the resonant reed 534. Thus, when the special signal appears at the audio amplifier output it will trigger the reed and close the contacts thereof, causing reed amplifier 520 to produce an output signal which actuates the CALLBACK PULSE relay 205. At this point, the CALLBACK PULSE cam contacts, which are closed, along with contacts *c* of the CALLBACK PULSE relay, complete a circuit which energizes the CALLBACK HOLD relay 206. This causes CALLBACK PULSE relay contacts *d* to energize the REWIND relay 207 by connecting it to a —22 volt source. However, the rewind operation does not begin yet; for as long as the transmitter signal persists, maintaining the CALLBACK PULSE relay actuated, CALLBACK PULSE relay contacts *a*, in series with rewind solenoid 414, are open. The CALLBACK HOLD cam contact is also closed during a time interval after the "beep" tone, connecting —22 volts through CALLBACK HOLD relay contacts *d* to the CALLBACK HOLD relay energizing coil, thus forming a hold circuit to maintain the CALLBACK HOLD relay in its energized state after the callback transmitter pulse ceases to exist.

It should be noted that the transmitter signal is only effective to cause read out of the recorded messages during that period of time when the CALLBACK PULSE cam contact is closed; if it is open, actuation of the CALLBACK PULSE relay by the reed amplifier 520 cannot actuate the CALLBACK HOLD relay.

The rewind operation cannot begin unless the CALLBACK HOLD relay is actuated; if it is not, then while the CALLBACK PULSE relay is actuated by the signal from reed amplifier 520, CALLBACK PULSE relay contacts *a* are open. Since they are in series with the rewind solenoid 414, it cannot be actuated. And as soon as the CALLBACK PULSE relay contacts *a* close, when the rewind relay is de-energized, the circuit of solenoid 414 is broken by virtue of REWIND relay contacts *a*.

Up to the time when the rewind solenoid 414 is actuated, that is, when the code transmitter signal ceases, the IN tape deck remains operative, recording the transmitter oscillator signal. During this time, the RECORD relay is held actuated (since CALLBACK HOLD relay contacts *b* are now open) by a circuit including CALLBACK PULSE contacts *b* and the contact switch associated with the IN cam. As soon as this signal is terminated by the caller, the CALLBACK PULSE relay 205 is released, completing the circuit to the rewind solenoid 414 of IN tape deck 410 and causing the tape with the recorded messages to rewind. This also releases the RECORD relay. The IN relay remains actuated, since it controls the current supplied to the IN tape deck drive motor.

The REWIND relay 207 is a self-holding relay, by virtue of the fact that its coil is connected to a source of —22 volts through REWIND relay contacts *d*, RESET relay contacts *c*, and IN relay contacts *d*. When the tape on the IN tape deck 410 is completely rewound, a metallic portion of the tape shorts the two halves of reset trigger 412, actuating the RESET relay 208 and thus deactuating the REWIND relay 207, by virtue of the last-mentioned holding circuit.

Since this de-energizes rewind solenoid 414, the IN tape deck will proceed to read out the messages previously recorded on it. Since the RECORD relay has not been re-energized, the amplifier 500 is connected to amplify the signals picked up by the IN tape playback head and transmit them over the telephone via the audio loop coil, connected to its output.

The caller continues to receive the messages which were recorded on the tape until, when the tape reaches a point at which it was just prior to the call, the oscillator signal which was recorded on the tape simultaneously with the commencement of the read out cycle is picked up by the playback head of IN tape deck 410. The appearance of this signal at the output 506 of audio amplifier 500 actuates the resonant reed 534, closing the contacts thereof and energizing the CALLBACK PULSE relay 205.

Approximately 5 to 15 seconds after the IN tape deck began to operate, the CALLBACK PULSE cam opened its associated contact. The CALLBACK HOLD relay, having been actuated, remained held on via contacts *b* of the CALLBACK PULSE relay. Thus, when the CALLBACK PULSE relay is energized a second time, its contacts *b* release the CALLBACK HOLD relay, ending the read out.

Energization of the CALLBACK PULSE relay also actuated the REWIND relay, which by virtue of its holding circuit will remain on until the holding circuit is broken. Thus, when the CALLBACK PULSE relay is released, after the recorded oscillator signal has passed the playback head, its contacts *a* along with REWIND relay contacts *a* energize the rewind solenoid 414, causing the tape to begin rewinding. The tape will continue to rewind until the IN cam causes the IN relay to release, thus breaking the REWIND relay holding circuit. The rewind time will be approximately 1 second, depending upon the adjustment of the cams (see "Timer Motor Control Sequence"); long enough to bring that portion of the tape containing the oscillator signal back past the recording head, so that further incoming messages will record over and erase the oscillator signal.

Timer motor control sequence

When the caller initiates automatic callback operation, by transmitting an oscillatory signal to actuate the CALLBACK PULSE relay via the resonant reed, CALLBACK HOLD relay contact *c* shifts the timer motor current source from a circuit including the RUN cam contact 103, to a circuit including the STOP cam contact 104. The STOP cam contact remains closed until a point shortly (about a second) before the instant when the IN cam would otherwise open its associated contact. At this point it opens, breaking the timer motor circuit. This allows the read out to take as long a time as is necessary, an interval dictated solely by the length of the recorded messages. As may be seen from the timing diagram of FIG. 11, the interval between the point where the STOP cam opens the timer motor circuit and the point where the IN cam subsequently operates defines the rewind period mentioned in the previous section, during which the tape is rewound so as to allow the oscillator signals to be erased by later recording.

When read out of the recorded messages is finished and the playback head senses the prerecorded oscillator signal, causing release of the CALLBACK HOLD relay, the timer motor connection is again changed, this time from the STOP cam 104 to the RUN cam 103, which again completes the timer motor circuit, allowing the cycle to finish, putting down the receiver, and placing the system in condition to receive further messages.

GENERAL CONSIDERATIONS

Miscellaneous

It was mentioned previously that the criterion on the fidelity of the input tape deck was a function of other elements of the system. This criterion is that the deviation in frequency between a recorded signal, and the same signal played back from the tape deck, be smaller than one half the operating bandwidth of the resonant reed 534, less the maximum frequency variation in whatever oscillator is to be used for callback purposes. The maximum frequency variation of the oscillator may be defined as the maximum difference between its actual output frequency and its expected output freqeuncy.

It is possible, although improbable, that an extraneous noise source near the telephone mouthpiece when a party calls in to leave a message could actuate the resonant reed, and thus initiate a callback cycle. This is highly undesirable, since privacy demands that only the owner of the system have access to the recorded messages. In order to prevent any possibility of an unauthorized person initiating a callback cycle, the system may be designed so as to require the transmission of two or more different frequencies at the same time in order to initiate callback operation. This could be done with a transmitter which produces two freqeuncies, and by providing two independent resonant reeds in the system in place of the reed 534. Each of these reeds would by tuned to one of the transmitter frequencies, and actuation of both of them would be required in order to cause the messages to be read out. The input windings of both reeds may be connected in series with the reed amplifier.

Recording the OUT tape

In order to prerecord a message on the OUT tape deck, for transmission to callers, the push button switches on the console may most conveniently be used. The OUT tape button 307 and the PLAY-RECORD button 306 should be first depressed. Then pressing the OUT-REWIND button 308 initiates the OUT tape deck cycle, and the outgoing message may be recorded either through a microphone plugged into microphone jack 302, or through the telephone handset. The permissable duration of the outgoing message is indicated by the OUT tape indicator lamp 423, which remains on for the OUT tape deck cycle.

In order to play back the message thus recorded, only the OUT tape button 307 should be depressed; pressing the OUT-REWIND button 308 again initiates the OUT tape deck cycle, at which time the message recorded may be monitored.

Cycle test

In order to test the normal call cycle, one need only press the OUT-REWIND button 308, and energize the ring relay amplifier, for instance through a push button which connects the input to a voltage source. This will send the system through its complete cycle of incoming call operation. Indicator light 416 indicates when the IN tape deck is operating.

Other modes of operation

It is possible to review the material recorded on the IN tape deck manually, without regard to the automatic features of the system. This may be done through foot switch 450, which, when actuated, energizes solenoid 414 by actuating REWIND relay 207, to rewind the tape as long as the foot switch is depressed. The REWIND relay holding circuit is rendered inoperative during foot switch operation by depressing the OUT tape switch 307, so that no holding circuit may be formed. When the foot switch is released, the tape deck will play in the forward direction. Whether it will record or play back in this forward direction is dependent upon whether the PLAY-RECORD button 306 is in the depressed or released position, respectively. All operation of the tape deck must occur with the IN tape button 305 depressed. Rewind indicator lamp 415 is useful in this connection, since it warns an operator not to record during rewind operation.

If one wishes to manually operate the system so that it will read out all messages which callers have recorded on the IN tape deck, one need only depress the IN tape button 305, and then press the OUT-REWIND button 308 momentarily. As long as the button 305 is depressed, the messages on the IN tape deck 410 will be played back over the telephone headset. To stop playback, when all messages of interest have been heard, button 305 must be released. If it is desired to erase all messages from the tape or reset the IN tape deck to the beginning of the tape reel, button 305 should be depressed, and then button 308 momentarily depressed, as above. Then wait until the rewind indicator lamp 415 goes out, at which time releasing button 305 will leave the tape at the beginning of the reel.

To record on the IN tape deck, the IN tape button 305 and the PLAY-RECORD button 306 must be depressed. A recording microphone may be plugged into jack 302.

For both recording and playing back, a record level indicator may be connected across the output terminals of audio amplifier 500, so that the proper level may be set, using the volume control. This meter has another desirable feature. When the device is in normal message cycle operation, it is possible for one to watch the meter and thereby judge by its action whether or not the person calling in is leaving a message or not. If the meter is indicating a message, it may be that the person in attendance would desire to monitor the call by means of the earphone or the conference selector button, or to break into the telephone conversation if urgent enough. The level indicator also indicates proper functioning of either tape deck, telephone pickup or microphone, operation of either tape deck, and proper function of recording and playback heads.

Conference phone operation

The device includes circuitry for connecting a high sensitivity microphone to the audio amplifier input instead of the microphone in the telephone handset, so that the voices of several persons in a room may be picked up by the microphone and fed to the amplifier to be recorded or transmitted over the telephone. When one of these parties is speaking, the microphone is actuated; when the sound level at the microphone drops below a predetermined level, the microphone is de-actuated to prevent feedback. The conference circuit is brought into operation by depressing the conference button 304. In addition, the conference microphone, which may be any high sensitivity microphone, preferably omni-directional, is plugged into jack 140, the "ring" loop having been unplugged therefrom. A remote conference switch, which may be conveniently attached to the conference microphone, is plugged into jack 309.

Depression of the conference button energizes the IN and RECORD relays, connecting the record head to the audio amplifier and starting the IN tape deck motor. In addition, depression of the conference button connects the speaker to the amplifier output, and the conference relay 209 is energized, disconnecting the audio loop from the audio output and connecting it to the audio input terminal of the amplifier via RECORD relay contacts *b* and *d*.

RING relay 201 is made a part of the conference circuit when the conference button is depressed, and when the remote conference switch, located preferably at the microphone, is closed, the coil of RING relay 201 is connected to ground, energizing the relay. This opens RING relay contact *d*, de-actuating the conference relay 209, and thereby removing the audio loop coil from the amplifier input circuit and connecting it to the output circuit. Thus, the audio loop coil becomes a "speaker" rather than a microphone, transmitting messages to the telephone receiver from the amplifier. Simultaneously, the conference microphone is connected to the input circuit of the audio amplifier by RING relay contacts *c* and the speaker 531 is disconnected from the amplifier output by RING relay contacts *a*. Thus by opening and closing the remote conference switch, the microphone may be used to transmit messages over the telephone, or the speaker may be used to hear messages received over the telephone, respectively.

Figure 14:
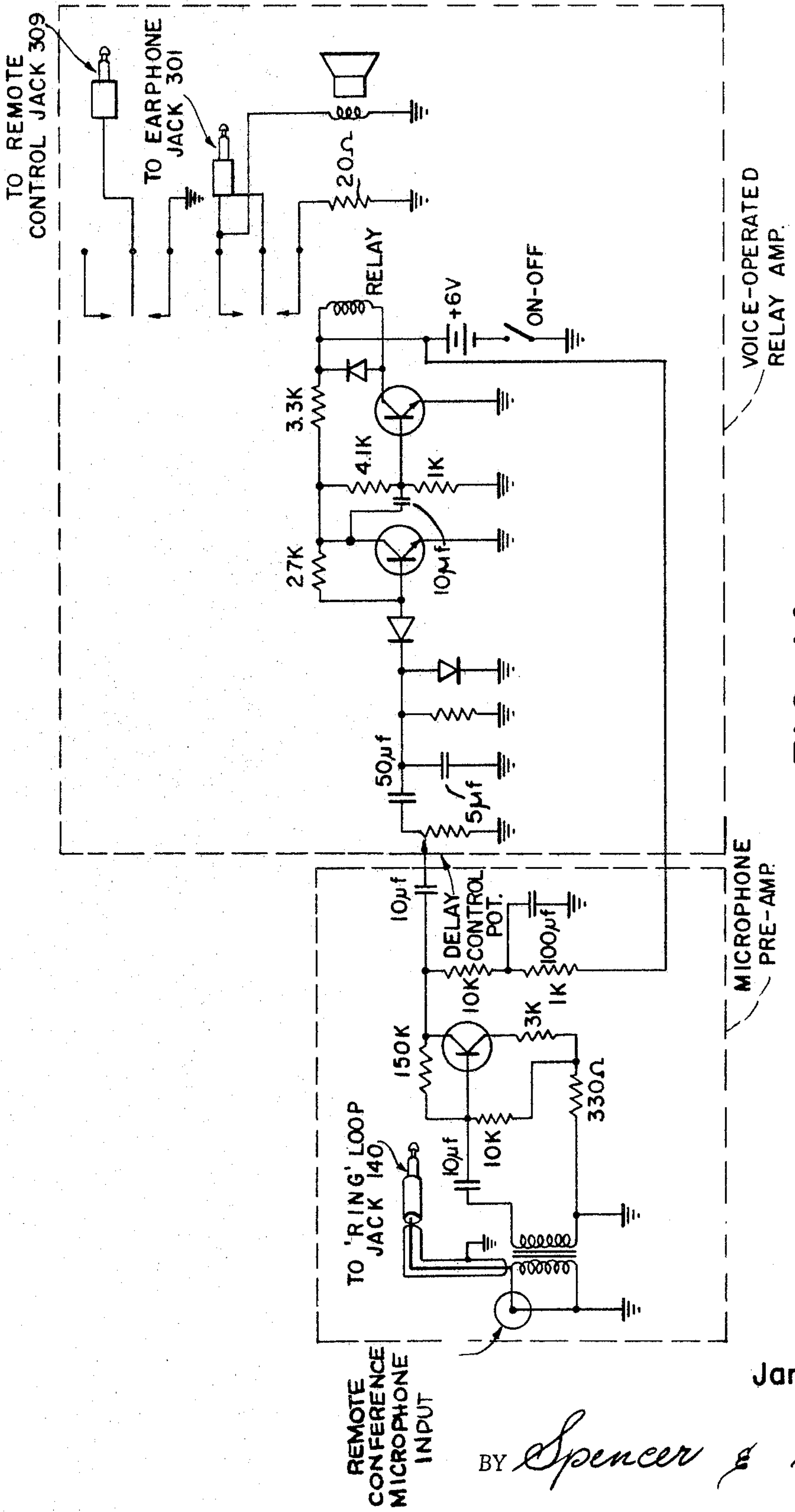
FIG. 14 is a circuit diagram of a voice operated remote conference switch.

The conference switch may alternatively be a sound-actuated switch, as shown in FIG. 14, so that any sound of a conversational level picked up by the microphone will cause the switch to be actuated. This makes manual operation of the switch unnecessary during a conference call. In order to prevent short lapses in speech from changing over the conference relay 209, thereby creating an audible and undesirable sound, the conference relay may be a time delay relay. As shown in FIG. 2, a series-connected resistor and capacitor are connected in parallel with the relay coil. After the relay is on for a short period, the capacitor will be charged, and the capacitor discharge through the resistor when RING relay contacts *d* are opened will maintain the relay on for a period of, say, one-half second.

The IN tape deck will remain on and record both sides of the conference call. The speaker is connected to the audio output when the remote conference button is off, permitting the party on the line to be heard at conversational volume. When the remote conference switch is on, the speaker is disconnected from the circuit via RING relay contacts *a*, preventing speaker-to-microphone feedback.

Figure 13:
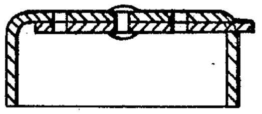
FIGS. 12 and 13 are front elevational and side sectional views, respectively, of a cap for the telephone handset microphone.
Figure 12:
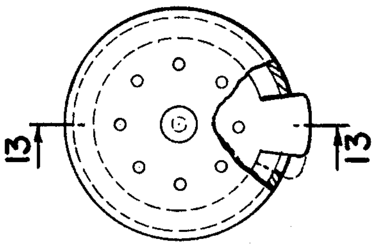

In order to prevent feedback caused by the telephone handset microphone, picking up the speaker output, a molded plastic or bakelite cover, shown in FIGS. 12 and 13, may be placed over the microphone end of the handset. This cover should be perforated, and have a disk with similar perforations rotatably mounted next to it. Thus, when the holes in the cover and the disk are lined up, one may speak through the handset microphone, whereas when the disk is rotated so as to disalign the holes, microphone action of the handset is effectively prevented.

It will be understood that the above description of the present invention is susceptible to various modifications, changes and adaptations, and the same are intended to be comprehended within the meaning and range of equivalents of the appended claims.

What is claimed is:

1. An automatic telephone answering system for use with a telephone and comprising, in combination:

means for sequentially recording incoming messages, including a callback code message received via the telephone at any time during a period for recording an incoming message, on a longitudinally extending recording medium and for playing them back;

code message sensing means including a resonant reed relay tuned to the frequency of the code message and a reed amplifier having its input connected to an input power source via said reed relay for producing an output constituting an amplified version of the code message;

switching means selectively connecting said code message sensing means to receive incoming code messages at the start of an incoming message recording period and connected to the output of said reed amplifier, said switching means being responsive to the termination of a callback code message, received over the telephone associated with the system, for rewinding such recording medium and for selectively connecting said code message sensing means to receive a recorded callback code message;

means for sensing, during rewind, a point on such recording medium prior to the beginning of the first recorded message;

means responsive to the sensing means for stopping rewind and causing said recording means to play back the messages recorded thereon in sequence; and means in circuit with the playback means, responsive to playback of the recorded callback code message, for rewinding the recording medium back past the recorded callback code message and then stopping it, so that the system will again respond to incoming calls and record incoming messages on the recording medium.

2. An automatic telephone answering system including a recorder, said system comprising, in combination;

means responsive to the ringing of an associated telephone for initiating a timing cycle;

means for signalling at a plurality of sequential points in the timing cycle;

means responsive to a signal at a first point in said timing cycle for lifting the telephone headset from its cradle;

means responsive to a signal at a second point in the timing cycle for playing an outgoing message over the telephone;

means responsive to the end of the outgoing message for sounding a beep tone over the telephone;

means responsive to a signal at a third point in the timing cycle for actuating a recorder to record, on a recording medium, messages received over the telephone;

means responsive to a signal at a fourth point in the timing cycle for stopping the recorder;

means responsive to a signal at a fifth point in the timing cycle for replacing the telephone headset in its cradle;

means responsive to the signal at said third point in the timing cycle for actuating an automatic callback circuit for an interval ending at most at said fourth point;

first means in said automatic callback circuit responsive to receipt of a code signal during said interval for interrupting the timing cycle;

second means in said automatic callback circuit responsive to said code signal for initiating rewind and sequential playback of the messages recorded on the recording medium;

third means in said automatic callback circuit responsive to said code signal for blocking the effect of said second means for the duration of the code signal; and fourth means responsive to a signal at a sixth point in the timing cycle, intermediate said third and fourth points, for connecting the first means to be responsive to operation of the third means for continuing the timing cycle, so that playback of the recorded code signal causes the first means to continue the timing cycle.

3. A conference call device for conducting conference calls over a telephone, said device comprising, in combination:

an audio amplifier;

means for inductively coupling the amplifier to such telephone to obtain signals therefrom and to transmit signals thereto;

switching means for connecting the inductive means to the audio amplifier input, in a first state, and to the audio amplifier output, in a second state;

a conference microphone;

means for connecting the conference microphone to the amplifier input when said switching means is in its second state;

a speaker;

means for connecting the speaker to the amplifier output when the switching means is in its first state;
remote conference switch means for setting the switching means to either of the first and second states, so that in the second state, the microphone transmits sounds to the telephone through the inductive coupling means, and in the first state, the inductive coupling means transmits sounds through the audio amplifier to the speaker; and
a closable cap mountable on the mouthpiece of such telephone for preventing the mouthpiece from receiving sounds.

4. A device as defined in claim 3, wherein said remote conference switch means is mounted on said conference microphone.

5. A device as defined in claim 3, wherein said remote conference switch means is a voice-operated switch for setting said switching means to its second state when sounds are picked up by the conference microphone and for setting the switching means to its first state when no sounds are picked up.

6. A device as defined in claim 5, wherein said switching means includes a relay for connecting said inductive means to the audio amplifier input and output in said first and second states, respectively, said relay including means for delaying the transistion of the relay from the second to the first states after the conference microphone ceases to pick up sounds.

7. A device as defined in claim 6, wherein the relay includes an actuating coil, said delaying means including a series resistance-capacitance circuit connected in parallel with the actuating coil, so that when the relay is actuated, in said second state, the capacitor will be charged, and when the relay is de-actuated, in said first state, the capacitor will discharge through said coil, maintaining the relay actuated for a short interval.

8. A device as defined in claim 7, further including means for recording both sides of the conference call.

9. In an automatic telephone answering system the improvement of apparatus responsive to a callback code signal transmitted via an associated telephone for reading out, over the telephone, all messages in the form of signals previously recorded by the answering system, said improvement comprising, in combination:
a plurality of rotary cams mounted on a shaft;
a timing motor for driving said shaft;
a first switch actuated by one of the cams;
inductive means connected to the telephone receiver for receiving and transmitting messages via said receiver;
an audio amplifier having an input and an output;
means for recording signals on and playing back signals from a recording medium;
first relay means for connecting the inductive means to the amplifier input and the playback-record means to the amplifier output in a first state and connecting the playback-record means to the amplifier input and the inductive means to the amplifier output in a second state;
circuit means, including the first cam-actuated switch for setting the first relay to said first state upon closing of the cam-actuated switch;
second relay means, connected to be actuated by the amplifier output, responsive to a callback code signal arriving via the telephone for initiating rewind of the recording medium and setting the first relay to its second state, and maintaining the second relay means energized;
third relay means for preventing the second relay means from initiating the rewind and from setting the first relay to its second state, for the duration of the callback code signal;
means for terminating rewind of the recording medium and causing said medium to move in a playback direction, so that the recorded signals are played back to the caller;
a second switch actuated by another of said cams and connected in circuit with said second and third relays for connecting said relays so that energization of the third relay will de-energize the second relay, so that when the playback means senses the recorded callback code signal, the third relay is energized and the second relay is de-energized;
means responsive to de-energization of the third relay, when the recorded callback code signal has passed the playback means, for causing the recording medium to rewind for a short interval, so that the recorded callback code signal is behind the playback means; and
means responsive to de-energization of the second relay for stopping the recording medium after said rewind interval so that further message signals may then be recorded on it.

10. A device as defined in claim 9, further including a third cam-actuated switch connected in circuit with the second relay for allowing the second relay to operate only when the second switch is in a predetermined one of its two possible positions.

11. A device as defined in claim 10, further including a fourth cam-actuated switch, actuatable by one of the plurality of rotary cams, responsive to starting of the timing motor for keeping the timing motor running for a predetermined cycle; and
means responsive to the energization of the second relay means for causing the timing motor to stop before the end of said predetermined cycle and to remain stopped until the second relay means is de-energized, whereupon the motor runs for the remainder of the predetermined cycle.

12. A device as defined in claim 11, further including means responsive to ringing of the telephone for starting the timing motor; a further cam mounted on said shaft; and means responsive to the further cam for lifting the telephone headset at the beginning of said cycle and for lowering the headset at the end of the cycle.

13. A device as defined in claim 9, further including means associated with said automatic telephone answering system for allowing a conference call to be conducted over the telephone associated therewith, said conference means including:
a conference switch for actuating said conference call means;
a conference relay included in said first relay means for connecting the inductive means to the amplifier input in a first state, and connecting the inductive means to the amplifier output in a second state;
a conference microphone;
a conference speaker;
conference switching means for setting said conference relay to its first state and connecting the conference speaker to the amplifier output in a primary state, and for connecting the conference microphone to the amplifier input and setting the conference relay to its second state in a secondary state; and
a remote conference switch for setting the conference switching means to either of its secondary and primary states.

14. A device as defined in claim 13, wherein the remote conference switch is a voice-operated switch connected to the conference microphone for setting the conference switching means to its secondary state when sounds are picked up by the conference microphone.

15. A device as defined in claim 14 wherein said conference relay includes a relay-actuating coil, and including a series connected resistor and capacitor connected in parallel with said actuating coil for delaying the transition of the conference relay from its second state to its first state.

16. A device as defined in claim 15, including a closable cap mountable on the mouthpiece of such telephone for preventing the mouthpiece from receiving sounds.

(References on following page)

References Cited

UNITED STATES PATENTS

| | | | |
|---|---|---|---|
| 2,180,498 | 11/1939 | Barnes | 179—6 X |
| 2,461,945 | 2/1949 | Tschumi | 179—1 |
| 2,477,275 | 7/1949 | Tschumi | 179—1 |
| 2,539,139 | 1/1951 | Jordanoff et al. | 179—6 |
| 2,539,515 | 1/1951 | La Forest | 179—6 |
| 2,558,669 | 6/1951 | Breen | 179—100.4 X |
| 2,784,254 | 3/1967 | Lane | 179—6 |
| 3,050,585 | 8/1962 | Zimmermann | 179—6 |
| 3,127,474 | 3/1964 | Waldman | 179—6 |
| 3,189,690 | 6/1965 | Millett | 179—1 |
| 3,337,690 | 8/1967 | Martin | 179—6 |
| 2,425,061 | 8/1947 | Hart | 179—188 |
| 3,060,408 | 10/1962 | Stewart | 340—171 |
| 3,136,856 | 6/1964 | Zimmermann | 179—6 |
| 3,293,365 | 12/1966 | Mitsui | 179—6 |
| 3,310,629 | 3/1967 | Yamamoto et al. | 179—6 |

BERNARD KONICK, Primary Examiner

R. F. CARDILLO Jr., Assistant Examiner

U.S. Cl. X.R.

179—1